(12) United States Patent
Lichauer

(10) Patent No.: US 12,237,661 B2
(45) Date of Patent: Feb. 25, 2025

(54) SOLID STATE CIRCUIT INTERRUPTER WITH SOLID STATE INTERLOCKING MECHANISM

(71) Applicant: EATON INTELLIGENT POWER LIMITED, Dublin (IE)

(72) Inventor: Andrew W. Lichauer, McMurray, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/238,638

(22) Filed: Aug. 28, 2023

(65) Prior Publication Data

US 2024/0030697 A1    Jan. 25, 2024

Related U.S. Application Data

(60) Continuation of application No. 17/748,478, filed on May 19, 2022, now Pat. No. 11,777,301, which is a division of application No. 16/746,002, filed on Jan. 17, 2020, now Pat. No. 11,368,010.

(51) Int. Cl.
*H02H 3/05* (2006.01)
*H02H 1/00* (2006.01)
*H02H 3/08* (2006.01)

(52) U.S. Cl.
CPC ............ *H02H 3/05* (2013.01); *H02H 1/0007* (2013.01); *H02H 3/08* (2013.01)

(58) Field of Classification Search
CPC .. H01H 71/04; H01H 71/1081; H01H 71/123; H01H 9/54; H01H 9/542; H01H 9/548; H02H 1/0007; H02H 1/0015; H02H 1/063; H02H 3/006; H02H 3/025; H02H 3/04; H02H 3/044; H02H 3/05; H02H 3/08; H02H 3/087; H02H 3/093; H02H 7/22; H02H 7/262; H02H 7/30; H02H 9/02

See application file for complete search history.

(56) References Cited

U.S. PATENT DOCUMENTS

| | | | | |
|---|---|---|---|---|
| 8,861,162 B2* | 10/2014 | Fuller | ............ | H01H 9/548 |
| | | | | 361/42 |
| 2008/0143462 A1* | 6/2008 | Belisle | ............ | H01H 9/542 |
| | | | | 335/201 |
| 2009/0257157 A1* | 10/2009 | Vicente | ............ | H02H 7/30 |
| | | | | 361/96 |

(Continued)

*Primary Examiner* — Jared Fureman
*Assistant Examiner* — Nicolas Bellido
(74) *Attorney, Agent, or Firm* — Eckert Seamans Cherin & Mellott, LLC

(57) ABSTRACT

A system includes a first circuit breaker comprising a first solid state switch, first mechanical contacts, and a current sensor structured to sense current flowing through the first circuit breaker, and a second circuit breaker electrically coupled to the first circuit breaker and being structured to interrupt current flowing to the first circuit breaker, wherein the first circuit breaker is structured to transmit, to the second circuit breaker, a request upon detecting a failure mode, and wherein the second circuit breaker is structured to interrupt current flowing to the first circuit breaker in response to receiving the request, and the first circuit breaker is further structured to open the first mechanical contacts when the current flowing through the first circuit breaker drops to a predetermined level.

18 Claims, 4 Drawing Sheets

(56) References Cited

U.S. PATENT DOCUMENTS

| | | | |
|---|---|---|---|
| 2012/0310429 A1* | 12/2012 | Vicente | H02H 7/30 |
| | | | 700/292 |
| 2020/0366079 A1* | 11/2020 | Telefus | H02M 1/083 |
| 2022/0045497 A1* | 2/2022 | Yang | H02H 3/021 |
| 2022/0158438 A1* | 5/2022 | Du | H02H 7/008 |
| 2022/0166210 A1* | 5/2022 | Du | H02H 7/008 |

* cited by examiner

SOLID STATE CIRCUIT INTERRUPTER WITH SOLID STATE INTERLOCKING MECHANISM

CROSS REFERENCE TO RELATED APPLICATION

This application is a continuation of U.S. Non-Provisional patent application Ser. No. 17/748,478, filed May 19, 2022, which is a divisional application of and claims priority to U.S. patent application Ser. No. 16/746,002, filed Jan. 17, 2020, now U.S. Pat. No. 11,368,010, issued Jun. 21, 2022, entitled SOLID STATE CIRCUIT INTERRUPTER WITH SOLID STATE INTERLOCKING MECHANISM, all of which are incorporated by reference herein.

BACKGROUND

Field

The disclosed concept relates generally to circuit interrupters, and in particular, to circuit interrupters with a solid-state interlocking mechanism.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Solid state circuit interrupters use solid state components, e.g., semiconductor devices, to switch on and off current flowing from a power source to a load. Solid state circuit interrupters may provide advantages over conventional mechanical circuit interrupters, e.g., faster interruption, smaller size, or better reliability.

UL 489I is the requirements Outline for Investigation for Solid State Molded Case Circuit Breakers. It is to be used in conjunction with UL 489, which is the standard for Safety for Molded-Case Circuit Breaker, Molded-Case Switches and Circuit-Breaker Enclosures. The scope of UL 489I covers solid state molded-case circuit breakers rated up to 1000 Vac and 1500 Vdc that switch using semiconductors and have integral air gap to provide isolation. The semiconductor devices used are known to have leakage current, so an air gap is still required to providing galvanic isolation to the load. Mechanical contacts are commonly used to create this airgap.

One advantage a solid-state circuit breaker has over a traditional circuit breaker is the size of this airgap. The solid-state breaker can use a much smaller airgap and does not require the use of arc chutes since the energy is dissipated within the semiconductor device itself. The reliability of the breaker is based on the semiconductor's ability to break the current before creating the airgap.

However, one of the failure modes of a solid-state component, e.g., the semiconductor device, is to short circuit. When such short circuit failure occurs, the solid state circuit breaker will be unable to open. Such a failure to trip the circuit breaker may be detrimental to the solid state circuit breaker, the circuit interruption system including the failed solid state circuit, and the load.

There is room for improvement in solid state circuit breakers and systems including solid state circuit breakers.

SUMMARY

These needs and others are met by embodiments of the disclosed concept in which a solid state circuit breaker in a failure mode requests an upstream circuit breaker to interrupt current flowing to it so that it can open its mechanical contacts.

In accordance with one aspect of the disclosed concept, a system comprises: a first circuit breaker comprising a first solid state switch, first mechanical contacts, and a current sensor structured to sense current flowing through the first circuit breaker; and a second circuit breaker electrically coupled to the first circuit breaker and being structured to interrupt current flowing to the first circuit breaker, wherein the first circuit breaker is structured to transmit, to the second circuit breaker, a request upon detecting a failure mode, and wherein the second circuit breaker is structured to interrupt current flowing to the first circuit breaker in response to receiving the request, and the first circuit breaker is further structured to open the first mechanical contacts when the current flowing through the first circuit breaker drops to a predetermined level.

In accordance with another aspect of the disclosed concept, a solid state circuit breaker comprises: a solid state switch structured to open to interrupt current flowing through the solid state circuit breaker; mechanical contacts structured to open to provide galvanic isolation; a current sensor structured to sense current flowing through the solid state circuit breaker; and an electronic trip unit structured to control the solid state switch to open or close and to control the mechanical contacts to open, wherein the solid state circuit breaker is structured to detect a failure mode of the solid state switch and responsively transmit, to an upstream circuit breaker, a request to interrupt current flowing to the solid state circuit breaker.

In accordance with another aspect of the disclosed concept, a method comprises: detecting a failure mode by a first circuit breaker, the failure mode comprising a failure to open a first solid state switch of the first circuit breaker; transmitting, by the first circuit breaker, a request to a second circuit breaker; receiving the request by the second circuit breaker; interrupting, with the second circuit breaker, current flowing to the first circuit breaker in response to receiving the request; detecting that current flowing through the first circuit breaker has dropped to a predetermined level; and opening, by the first circuit breaker, mechanical contacts in response to detecting that the current flowing through the first circuit breaker has dropped to the predetermined level.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
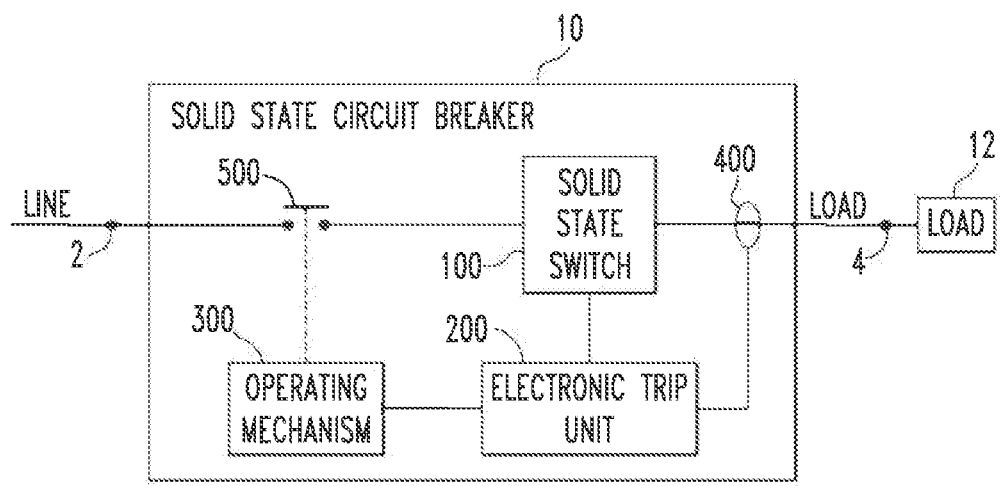
FIG. 1 is a diagram of a solid state circuit breaker in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

FIG. 1 is a diagram of a solid state circuit breaker 10 in accordance with an example embodiment of disclosed concept. The solid state circuit breaker 10 may be part of a larger system including additional circuit breakers, solid state and/or mechanical circuit breakers, such as the system shown in FIG. 2.

The solid state circuit breaker 10 is structured to be electrically connected between a power source and a load 12 via LINE and LOAD conductors 2,4. An upstream circuit breaker may be disposed between the power source and the solid state circuit breaker 10. The solid state circuit breaker 10 is structured to trip open or switch open to interrupt current flowing to the load 12 in the case of a fault condition (e.g., without limitation, an overcurrent condition) to protect the load 12, circuitry associated with the load 12, as well as the components within the solid state circuit breaker 10.

The solid state circuit breaker 10 includes a solid state switch 100, an electronic trip unit 200, an operating mechanism 300, a sensor 400, and mechanical contacts 500. The solid state switch 100 includes solid state switching elements (e.g., without limitation, metal-oxide-semiconductor-field-effect-transistors (MOSFETs), insulated-gate bipolar transistors (IGBTs)) that are structured to turn-on and turn-off (i.e., open and close) to allow or interrupt current flowing to the load 12. The solid state switch 100 is electrically coupled to the load 12 and the electronic trip unit 200.

The electronic trip unit 200 is structured to control the solid state switch 100 to open and close and also controls the operating mechanism 300 to trip open the mechanical contacts 500 based on a signal from the sensor 400. The electronic trip unit 200 may include a processing unit that may include a processor and a memory. The processor may be, for example and without limitation, a microprocessor, a microcontroller, or some other suitable processing device or circuitry. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory may store a firmware solution for solid state interlocking (SSI) where a first solid state circuit breaker, e.g., a downstream circuit breaker, fails to open its solid state switch, e.g., due to a short circuit of a solid state switch therein. The SSI is performed by the first solid state circuit breaker and a second circuit breaker, e.g., an upstream circuit breaker to the first solid state circuit breaker. The second circuit breaker may or may not be a solid state circuit breaker. An SSI-enabled downstream circuit and SSI-enabled upstream circuit breaker may together monitor and respond to interruption capability of their power semiconductors. The SSI is discussed further with reference to FIG. 2.

The electronic trip unit 200 is structured to determine a fault condition (e.g., without limitation, an overcurrent fault) and control the solid state switch 100 to open in response to the fault condition. Opening the solid state switch 100 interrupts current flowing to the load 12.

The operating mechanism 300 is structured to open the mechanical contacts 500 in response to a signal from the electronic trip unit 200. Opening the mechanical contacts 500 provides galvanic isolation between the power source and the load 12. For example and without limitation, the operating mechanism 300 is structured to cause mechanical contacts 500 to open by, for example and without limitation, moving a movable arm to cause the mechanical contacts 500 to separate. The electronic trip unit 200 is structured to control the operating mechanism 300 to open the mechanical contacts 500 only after the solid state switch 100 has been opened to interrupt current flowing through the solid state circuit breaker 10. In some example embodiments, the mechanical contacts 500 are not designed to interrupt a rated current flowing through the solid state circuit breaker 10, and the solid state circuit breaker 10 may lack components, such as an arc chute, to deal with the effects of the mechanical contacts 500 interrupting a rated current. As such, the mechanical contacts 500 should only be opened when the current flowing through the solid state circuit breaker 10 has dropped to a level where it is safe to open the mechanical contacts 500.

The sensor 400 may be a current sensor (e.g., without limitation, a current transformer, a Hall-Effect sensor, etc.) structured to sense the current flowing through the solid state circuit breaker 10. The output of the sensor 400 may be provided to the electronic trip unit 200.

The electronic trip unit 200 is structured to detect a failure mode of the solid state circuit breaker 10. The failure mode is a failure of the solid state switch 100 to open. In response to detecting the failure mode, the electronic trip unit 200 is structured to output a request to an upstream circuit breaker. In response to the request, the upstream circuit breaker is structured to interrupt current flowing to the solid state circuit breaker 10, which results in the current flowing through the solid state circuit breaker 10 dropping. The electronic trip unit 200 is structured to monitor the current flowing through the solid state circuit breaker 10 while it is dropping and to determine when the current drops to a predetermined level. The predetermined level is a level where it is safe to open the mechanical contacts 500. An example predetermined level is 5A. However, the predetermined level may be modified without departing from the scope of the disclosed concept. Once the current reaches the predetermined level, the electronic trip unit 200 controls the operating mechanism 300 to open the mechanical contacts 500. After opening the mechanical contacts 500, the electronic trip unit 200 sends a clear request to the upstream circuit breaker. The clear request indicates that the upstream circuit breaker can stop interruption of current flowing to the solid state circuit breaker 10. The drop in current flowing through the solid state circuit breaker 10 allows safe opening of the mechanical contacts 500. The clear request allows the upstream circuit breaker to quickly restore current so that interruption to other loads downstream of the upstream circuit breaker is minimized. In some example embodiments, the duration of the interruption may be on the order of microseconds and will have little effect on the other loads downstream of the upstream circuit breaker.

Figure 2:
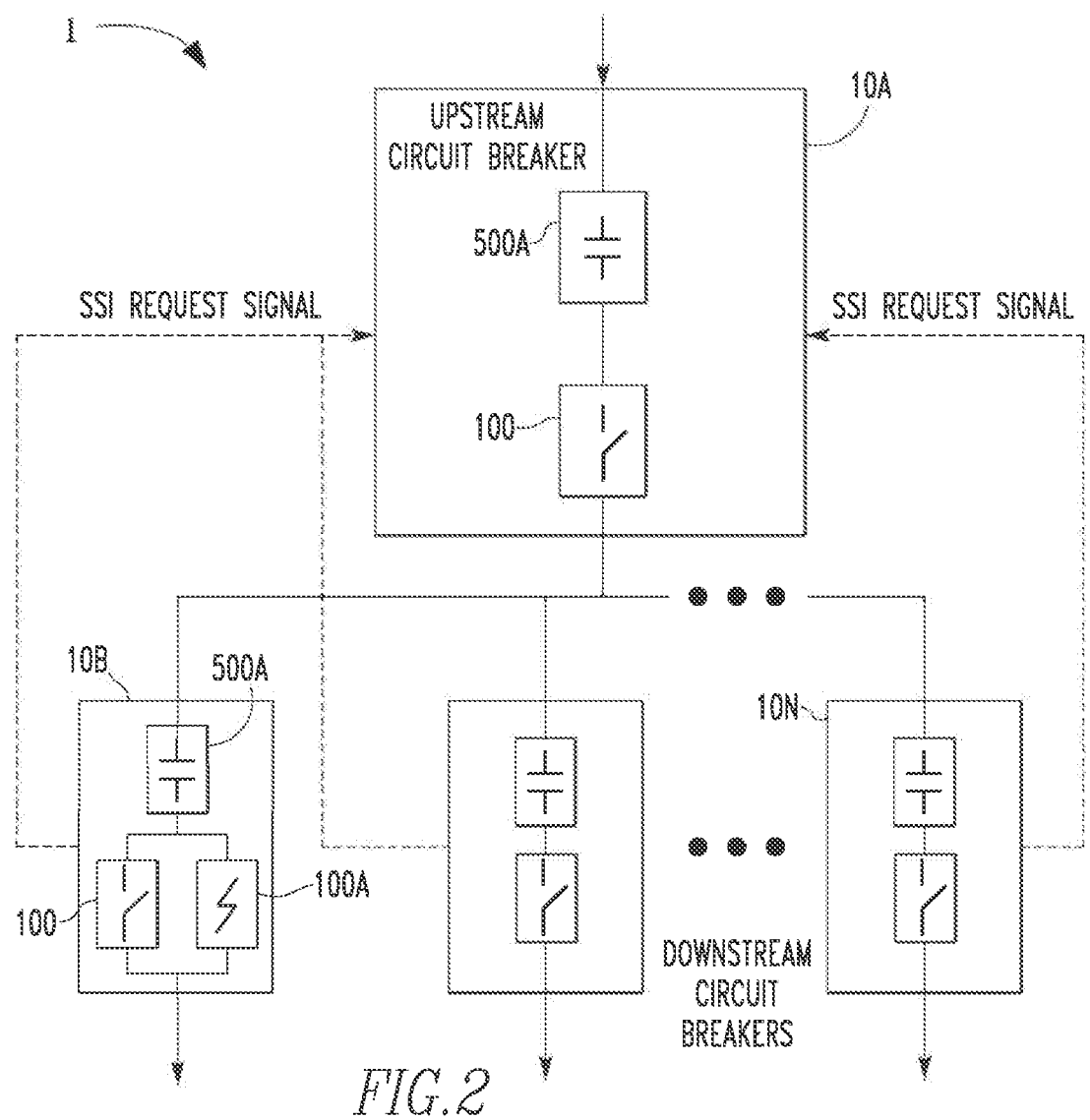
FIG. 2 is another diagram of a system in accordance with an example embodiment of the disclosed concept.

FIG. 2 is a diagram of a system 1 in accordance with an example embodiment of the disclosed concept. The system 1 may include one or more solid state circuit breakers 10. In FIG. 2, the system 1 includes a plurality of circuit breakers, e.g., an upstream circuit breaker 10A and downstream solid state circuit breakers 10B-N, where N is an integer. The upstream circuit breaker 10A may or may not be a solid state circuit breaker.

The circuit breakers 10A-N are electrically coupled to one another, and communicate with one another via any suitable communications protocols. For example, the circuit breakers 10A-N may be structured to communicate through wired or wireless communication. In wired communication, the circuit breakers 10A-N may communicate via powerline communication or via control lines. It will be appreciated that any suitable manner of communication may be employed between the circuit breakers 10A-N without departing from the scope of the disclosed concept. The circuit breakers 10A-N may communicate with one another to, e.g., request or perform a solid state interlocking (SSI) when a failure mode, e.g., a failure to open a solid state switch, is detected and one or more of the solid state circuit breakers fail to open. For example, if a solid state switch 100 of a downstream solid state circuit breaker 10B is short-circuited 100A, the solid state switch 100 of the downstream solid state circuit breaker 10B may not open. When the solid state switch 100 is unable to open and current continues flowing through the downstream solid state circuit breaker 10B, it is unsafe to open the mechanical contacts 500A. In response to the failure mode, the downstream circuit breaker 10B transmits a request (e.g., an SSI request) to the upstream circuit breaker 10A.

The SSI is both a hardware and firmware solution to one of the failure modes associated with the power semiconductor devices in a solid state circuit breaker. The SSI offers a firmware solution in that it provides a communication scheme and allows an upstream circuit breaker to recognize and react to a downstream circuit breaker with a failure mode, e.g., when the solid state circuit breaker is unable to open during a short-circuit event. For example, when an SSI enabled solid-state circuit breaker senses a short circuit failure in one or more of its semiconductor devices, it sends an SSI request to the closest upstream circuit breaker, and responsively, the closest upstream circuit breaker interrupts current flowing to the downstream circuit breaker. The SSI request may indicate that there was a failure to open the solid state switch of the downstream circuit breaker 10B and request the upstream circuit breaker 10A to interrupter current flowing to the downstream circuit breaker 10B. The SSI may be performed via an interruption logic embedded in the circuit breakers.

The downstream circuit breaker 10B is structured to monitor the current dropping due to interruption and then open its mechanical contacts 500A when the current reaches a predetermined level. The predetermined level may be a current level in which the requesting circuit breaker's mechanical contacts can safely open in all phases. The upstream circuit breaker 10A may create the interrupt current flowing to the downstream circuit breaker 10B by temporarily turning off its semiconductor device, e.g., an SiC MOSFET, IGBT, etc. The duration of the current interruption by the upstream circuit breaker may be tuned for a minimal impact on other loads downstream of the upstream circuit breaker 10A. The duration of the current zero may be microseconds (µs). In examples in which the upstream circuit breaker is a non-solid state circuit breaker (non-SSCB), the non-SSCB upstream circuit breaker may interrupt current by opening its mechanical contacts. As such, the non-SSCB may also require an additional action to reclose itself. In some example embodiments, though, the non-SSCB may be able to reclose its mechanical contacts.

Once the current is interrupted, the downstream solid state circuit breaker 10B detects the drop in current flowing through it reaching the predetermined level via a current sensor (e.g., the current sensor 400 described with reference to FIG. 1) and opens its mechanical contacts 500A. Upon opening the mechanical contacts 500A, the downstream circuit breaker 10B may send a clear request to the upstream circuit breaker 10A. The clear request may indicate that the failure mode is now remedied, e.g., the mechanical contacts of the downstream circuit breaker 10B are now open, and thus, it is clear for the upstream circuit breaker 10A to terminate the SSI mechanism and resume its normal operations.

Upon receiving the clear request, the upstream circuit breaker 10A may terminate the SSI, e.g., by closing its mechanical contacts or solid state switch. The upstream circuit breaker 10A then resumes its normal operations.

Figure 3:
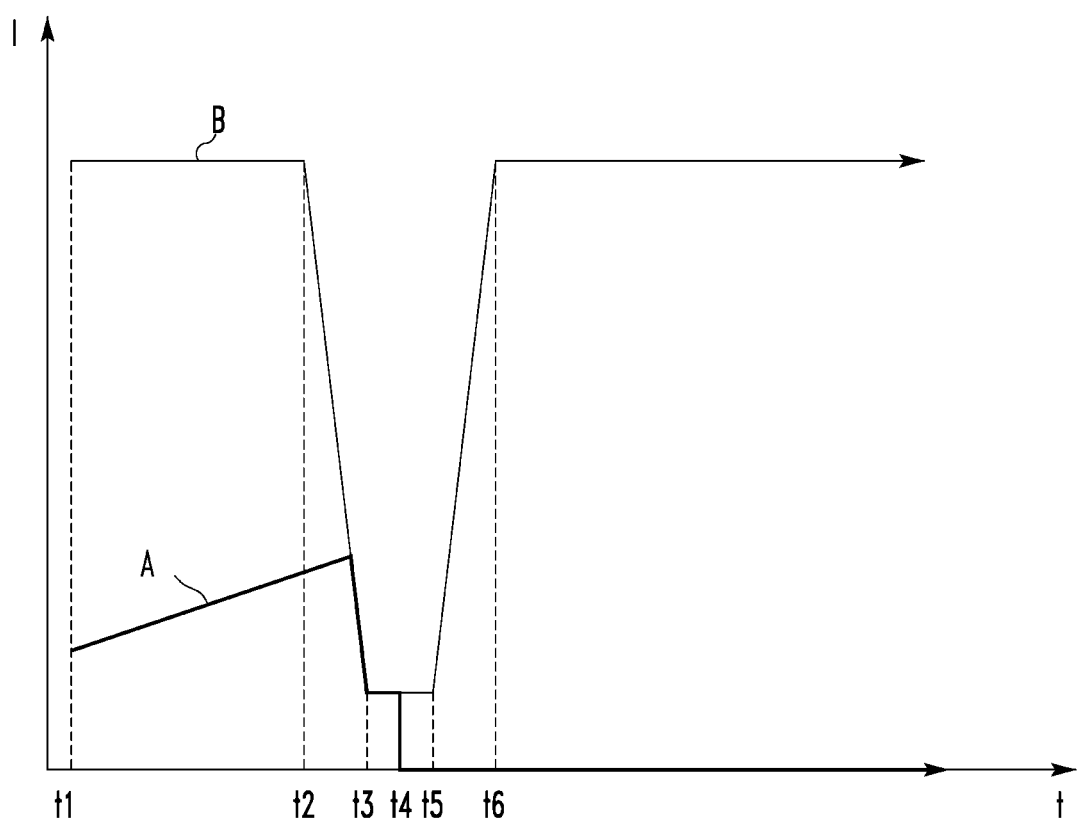
FIG. 3 illustrates waveforms of current flowing through circuit breakers in accordance with an example embodiment of the disclosed concept.

FIG. 3 includes waveforms for the current flowing through downstream and upstream circuit breakers in accordance with an example embodiment of disclosed concept. A is a waveform for the current flowing through a downstream circuit breaker, e.g., an SSI enabled downstream solid state circuit breaker. B is a waveform for the current flowing through an upstream circuit breaker, e.g., an SSI-enabled upstream circuit breaker.

At time t1, both the downstream circuit breaker and the upstream circuit breaker are closed.

Subsequent to time t1 and prior to time t2, a failure mode (i.e., a failure to open the solid state switch) of the downstream circuit breaker, occurs. The downstream circuit breaker detects this failure mode.

At time t2, the downstream circuit breaker transmits a request to the upstream circuit breaker. In response to the request, the upstream circuit breaker interrupts current flowing to the downstream circuit breaker, causing the current flowing through the downstream circuit breaker to drop. The downstream circuit breaker then waits for the current flowing through it to drop to a predetermined level where it is safe to open its mechanical contacts.

At time t3, the current flowing through the downstream circuit breaker reaches the predetermined level. In one example, the predetermined level may be 5A or less for a 100A solid state circuit breaker. However, it will be appreciated that other predetermined levels may be used without departing from the scope of the disclosed concept. At time t3, the downstream may begin the process of opening its mechanical contacts. Since this process takes an amount of time, the mechanical contacts may not actually be opened until t4. Once the mechanical contacts are open, the downstream circuit breaker sends a clear request to the upstream circuit breaker, indicating that the upstream circuit breaker can stop interruption of current flowing to the downstream circuit breaker.

At time t5, the upstream circuit breaker may receive the clear request from the downstream circuit breaker and stop interruption of current to the downstream circuit breaker by, for example, closing its solids state switch or mechanical contacts.

Between time t5, when the upstream circuit breaker stops interruption of current, and time t6, the current flowing through the upstream circuit breaker rises to its normal level, which it reaches at time t6.

Figure 4:
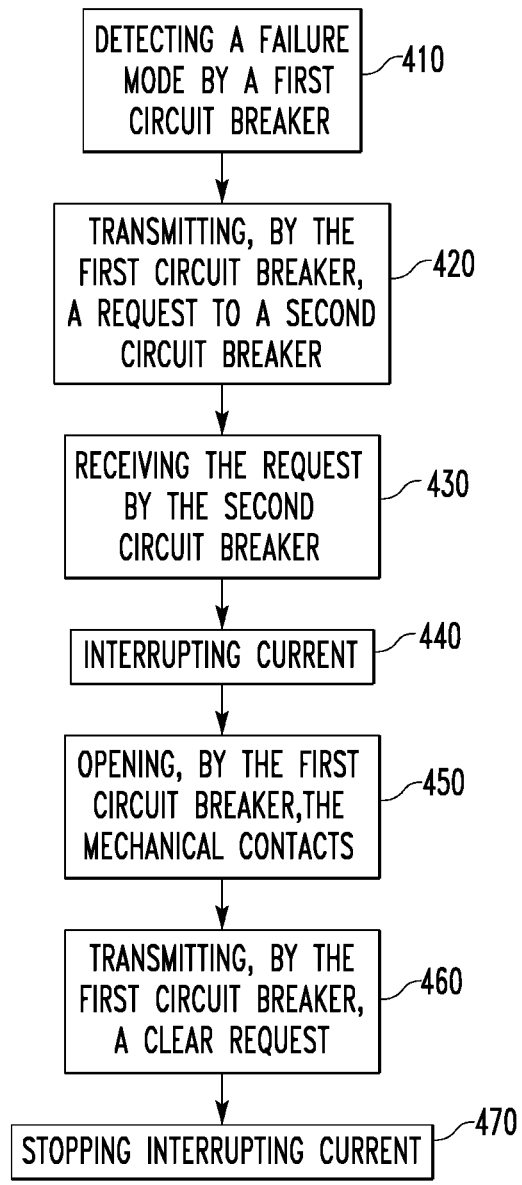
FIG. 4 is a flowchart of a method of solid state interlocking in accordance with an example embodiment of the disclosed concept.

FIG. 4 is a flow chart for a method 400 in accordance with an example embodiment of the disclosed concepts. The method may be performed by an upstream circuit breaker and a downstream circuit breaker of the circuit interrupter and respective processing units as described with reference to FIGS. 1-3.

At 410, the first circuit breaker detects a failure mode (i.e., a failure to open the solid state switch) The first circuit breaker may be a downstream circuit breaker as described with reference to FIG. 2.

A request may indicate that there was a failure to open the solid state switch of the first circuit breaker and request the second circuit breaker to interrupt current flowing to the first circuit breaker. At 420, the first circuit breaker transmits the request to a second circuit breaker. The second circuit breaker may be an upstream circuit breaker as described with reference to FIG. 2. There may be one or more upstream circuit breakers within the circuit interrupter, and the downstream circuit breaker transmits the SSI request signal to the closest upstream circuit breaker. The upstream circuit breaker may be either a solid state circuit breaker or non-solid state circuit breaker.

At 430, the second circuit breaker receives the request from the first circuit breaker.

At 440, the second circuit breaker interrupts current flowing to the first circuit breaker The second circuit breaker may interrupt the current by temporarily turning off its semiconductor device, e.g., an SiC MOSFET, IGBT, etc., via an interruption logic embedded within the memory of the upstream circuit breaker. The duration of the interruption by the second circuit breaker may be tuned for a minimal impact on the downstream breaker's loads. The duration be microseconds (μs).

At 450, the first circuit breaker opens the mechanical contacts when the current flowing through it drops to a predetermined level. The second circuit breaker waits for a clear request signal from the first circuit breaker. The clear request signal may indicate that the mechanical contacts of the first circuit breaker have been opened, and thus, it is clear for the second circuit breaker to stop interruption and resume its normal operations.

At 460, the first circuit breaker transmits the clear request to the second circuit breaker.

At 470, the second circuit breaker stops interruption of current to the first circuit breaker based at least in part on the clear request received. The second circuit then resumes normal operation.

Figure 5:
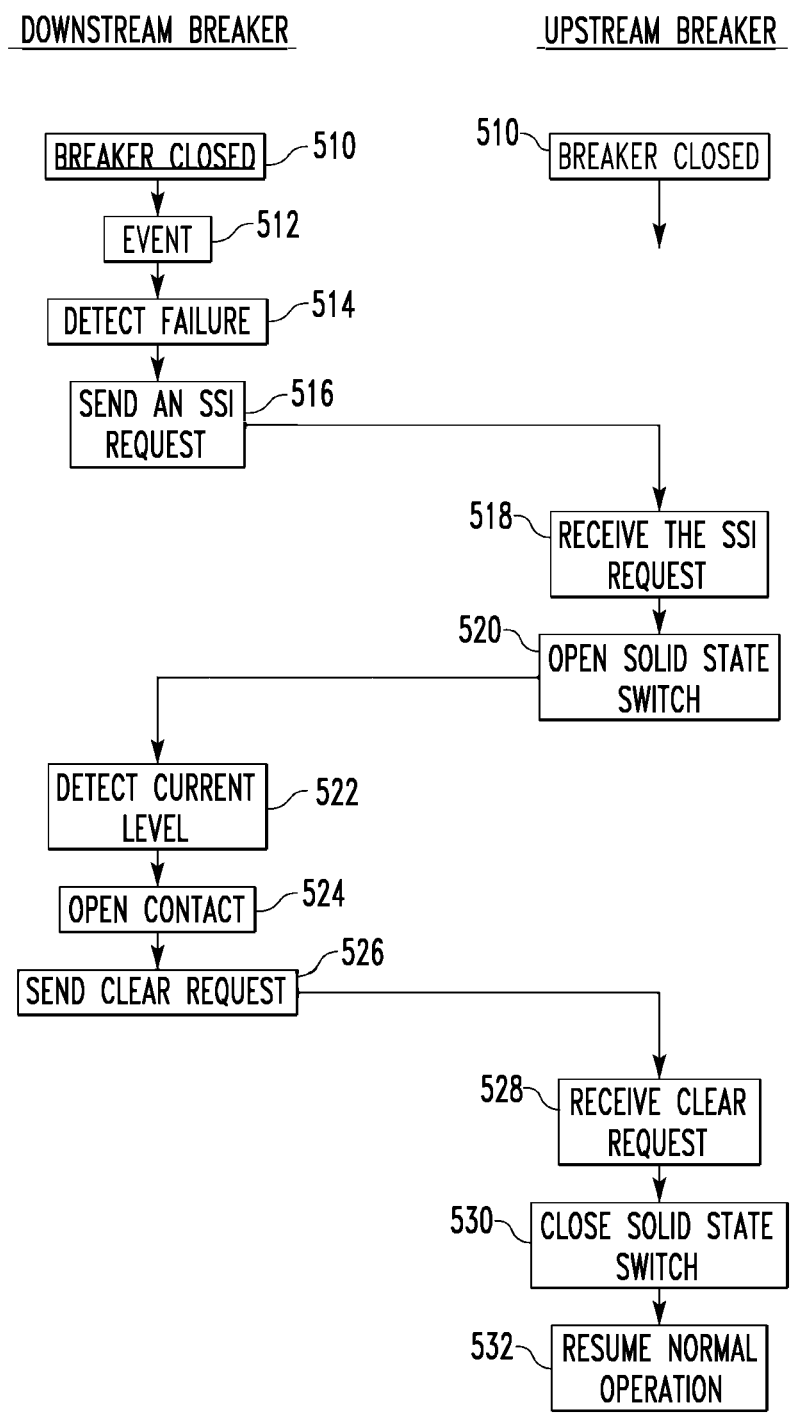
FIG. 5 is another flowchart of a method of solid state interlocking in accordance with an example embodiment of the disclosed concept.

FIG. 5 is another flow chart for a method 500 in accordance with an example embodiment of the disclosed concepts. The method may be performed by an upstream circuit breaker and a downstream circuit breaker of the circuit interrupter and respective processing units coupled to respective memories therein as described with reference to FIGS. 1-3.

At 510, both the downstream circuit breaker and the upstream circuit breaker are closed and perform normal operations.

At 512, a fault event within the downstream circuit breaker occurs. The fault event may include an overcurrent event.

At 514, the downstream circuit breaker detects that a failure mode occurred. That is, the downstream circuit breaker detects that its solid state switch has failed to open.

At 516, the downstream circuit breaker transmits a request signal to the upstream circuit breaker At 518, the upstream circuit breaker receives the request from the downstream circuit breaker.

At 520, the upstream circuit breaker opens its solid state switch to interrupt current flowing to the downstream circuit breaker.

At 522, the downstream circuit breaker detects the level of current flowing through it and when it detects that the level of current has dropped to a predetermined level, the method proceeds to 526. The downstream circuit breaker may detect the current zero via a current sensor (e.g., a current sensor 400 discussed with reference to FIG. 1). The predetermined level is a level at which it is safe for the downstream circuit breaker to open its mechanical contacts At 524, the downstream circuit breaker opens its mechanical contacts.

At 526, the downstream circuit breaker transmits the clear request to the upstream circuit breaker.

At 528, the upstream circuit breaker receives the clear request from the downstream circuit breaker.

At 530, the upstream circuit breaker stops interrupting current flowing to the downstream circuit breaker by, for example, opening its solid state switch.

At 532, the upstream circuit breaker resumes normal operations.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A system, comprising:
a plurality of first circuit breakers, each first circuit breaker comprising a first solid state switch structured to interrupt current flowing to respective load in an event of fault, first mechanical contacts structured to provide galvanic isolation, a current sensor structured to sense current flowing through respective first circuit breaker, and a solid state interlocking firmware structured to provide a communication scheme and allow solid state interlocking to be performed upon a detection of a failure mode; and
a plurality of second circuit breakers electrically connected upstream to the plurality of first circuit breakers, each second circuit breaker comprising the solid state interlocking firmware,
wherein the first circuit breakers and the second circuit breakers are structured to communicate with one another in a wired or wireless connection and perform together the solid state interlocking (SSI), and
wherein the failure mode comprises a failure of a first solid state switch of a first circuit breaker to open, and wherein for performing the SSI, the first circuit breaker is structured to send an SSI request to closest second circuit breaker upon the detection of the failure mode, and the closest second circuit breaker is structured to responsively interrupt current flowing to the first circuit breaker.

2. The system of claim 1, wherein the SSI request indicates that a failure to open the first solid state switch has occurred and requests the closest second circuit breaker to interrupt current flowing to the first circuit breaker.

3. The system of claim 1, wherein the closest second circuit breaker interrupts the current by turning off a solid state switch or mechanical contacts therein.

4. The system of claim 3, wherein the first circuit breaker is further structured to monitor the current dropping due to the interruption and open respective first mechanical contacts upon the current reaching a predetermined level.

5. The system of claim 4, wherein the predetermined level is a current level in which the first circuit breaker opens the respective first mechanical contacts in all phases.

6. The system of claim 5, wherein upon opening the respective first mechanical contacts, the first circuit breaker is further structured to send a clear request to the closest second circuit breaker.

7. The system of claim 6, wherein the clear request indicates that the failure mode is now remedied and it is clear for the closest second circuit breaker to terminate the SSI and resume normal operation.

8. The system of claim 7, wherein the clear request allows the closest second circuit breaker to restore the current such that a duration of the interruption comprises microseconds and the interruption to other first circuit breakers is minimized.

9. The system of claim 8, wherein upon receiving the clear request, the closest second circuit breaker is further structured to terminate the SSI.

10. The system of claim 9, wherein for terminating the SSI, the closest second circuit breaker closes the solid state switch or mechanical contacts therein and resumes normal operation.

11. The system of claim 1, wherein the first circuit breakers and the second circuit breakers communicate with one another via powerline communication or control lines in a wired connection.

12. A solid state circuit breaker for use in a system including one or more upstream circuit breakers, the solid state circuit breaker comprising:
a solid state interlocking (SSI) firmware structured to provide a communication scheme and allow solid state interlocking (SSI) to be performed upon a detection of a failure mode;
a solid state switch structured to open to interrupt current flowing through the solid state circuit breaker base on a detection of a fault;
mechanical contacts structured to open to provide galvanic isolation; and
a current sensor structured to sense current flowing through the solid state circuit breaker,
wherein the solid state circuit breaker is structured to communicate with a closest upstream circuit breaker having the SSI firmware and perform the SSI together with the closest upstream circuit breaker based on the detection of the failure mode,
wherein the failure mode comprises a failure of the solid state switch to open and wherein for performing the SSI, the solid state circuit breaker is further structured to send an SSI request to the closest upstream circuit breaker upon the detection of the failure mode, and the closest upstream circuit breaker is structured to responsively interrupt current flowing to the solid state circuit breaker.

13. The solid state circuit breaker of claim 12, wherein the SSI request indicates that a failure to open the solid state switch has occurred and requests the closest upstream circuit breaker to interrupt current flowing to the solid state circuit breaker.

14. The solid state circuit breaker of claim 13, wherein the solid state circuit breaker is further structured to monitor the current dropping due to the interruption and open the mechanical contacts upon the current reaching a predetermined level.

15. The solid state circuit breaker of claim 14, wherein upon opening the mechanical contacts, the solid state circuit breaker is further structured to send a clear request to the closest upstream circuit breaker and upon receiving the clear request, the closest upstream circuit breaker is further structured to terminate the SSI and resume normal operation.

16. The solid state circuit breaker of claim 15, wherein the clear request allows the closest upstream circuit breaker to restore the current such that a duration of the interruption comprises microseconds and the interruption to other downstream circuit breakers is minimized.

17. The solid state circuit breaker of claim 12, wherein the solid state circuit breaker communicates with the closest upstream circuit breaker in a wired or wireless connection.

18. The solid state circuit breaker of claim 17, wherein the solid state circuit breaker and the closest upstream circuit breaker communicate via powerline communication or control lines in a wired connection.

* * * * *